Oct. 4, 1966 W. D. SCHAEFFER 3,277,158
PRODUCTION OF VINYL ACETATE FROM ETHYLENE
Filed June 11, 1963
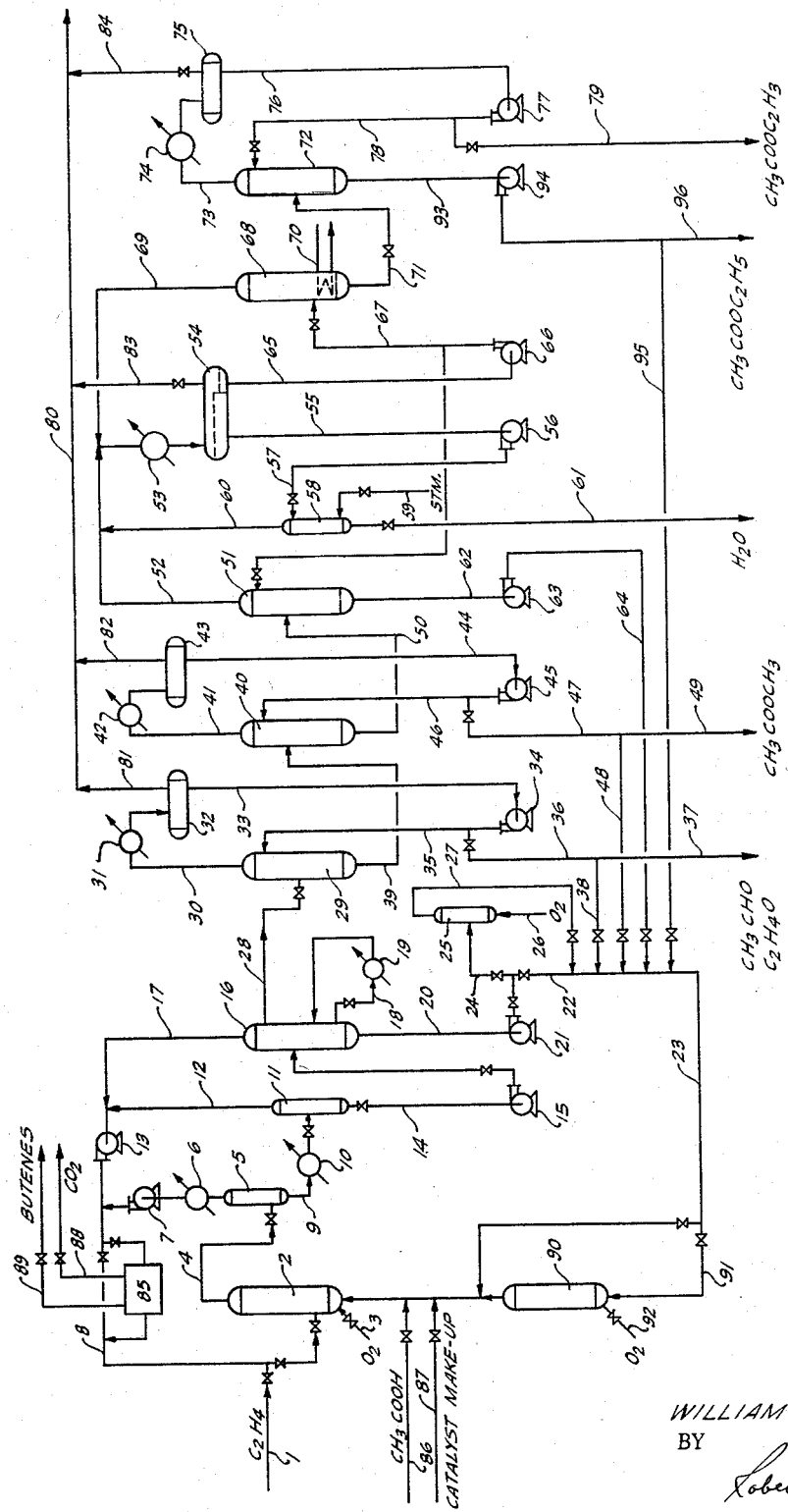
INVENTOR.
WILLIAM D. SCHAEFFER
BY
ATTORNEY United States Patent Office 3,277,158
Patented Oct. 4, 1966

3,277,158
PRODUCTION OF VINYL ACETATE
FROM ETHYLENE
William D. Schaeffer, Pomona, Calif., assignor to Union Oil Company of California, Los Angeles, Calif., a corporation of California
Filed June 11, 1963, Ser. No. 287,043
6 Claims. (Cl. 260—497)

This application is a continuation-in-part of my parent application Serial No. 241,713, filed November 27, 1962.

This invention relates to the oxidation of ethylene to vinyl esters and particularly to vinyl acetate by the oxidation of ethylene with an organic solvent containing catalytic amounts of a Group VIII metal and other oxidation catalysts.

In the aforecited application there is disclosed a process for the oxidation of ethylene to vinyl acetate with a catalyst solution comprising an aqueous acetic acid reaction medium that contains a Group VIII noble metal and a halogen-containing compound. Optionally, various "redox" compounds can also be included in this medium such as ferric and cupric salts and/or nitrogen oxides. In said process, oxygen or an oxygen-containing gas and ethylene are introduced into contact with the catalyst solution at temperatures between about 30° and about 300° C. and sufficient pressure to maintain liquid phase conditions, between about atmospheric and about 100 atmospheres, preferably between about 10 and about 75 atmospheres.

As disclosed in my parent application, ethylene is oxidized to vinyl acetate, acetaldehyde and acetic acid under the aforementioned reaction conditions and the yield of any or all of these products can be controlled by adjustment of the various process variables such as temperature, pressure, halide ion, acetate ion and water concentration. Additionally, it is disclosed in said application that the acetaldehyde product of the oxidation can, desirably, be recycled to the oxidation zone for conversion to acetic acid to supply the amount of this material consumed in the formation of vinyl acetate. In this way, it is disclosed, a process for the direct oxidation of ethylene to vinyl acetate can be provided that is independent of any extraneous source of acetic acid. Additionally, the recycling of the acetaldehyde to the oxidation zone tends to reduce induction or initiation periods that can frequently occur in this oxidation.

During the aforedescribed oxidation, there occurs an unavoidable concurrent oxidation of ethylene to various high boiling products such as ethylident diacetate, ethylene glycol diacetate, etc., as well as a slight degree of polymerization of the vinyl acetate to a low molecular weight polyvinyl acetate. These reactions are undesirable as they represent a loss of raw material and product. More seriously, however, the products of such reactions are higher boiling than the acetic acid solvent and therefore accumulate in the solvent, requiring periodic or continuous treatment of the recycled solvent.

It is an object of this invention to provide an efficient method for the oxidation of ethylene to vinyl acetate.

It is a further object of this invention to provide a method for the preparation of vinyl acetate wherein the only raw materials consumed are ethylene and oxygen.

It is an additional object of this invention to provide a method for the preparation of vinyl acetate from ethylene and oxygen wherein the accumulation in the reaction solvent of undesirable by-products such as ethylidene diacetate, ethylene glycol diacetate and polyvinyl acetate is minimized.

It is additionally a further object of this invention to provide conditions favoring the maximum reaction rates and vinyl acetate production in the aforedescribed oxidation.

Other and related objects of this invention will be apparent from the following disclosure.

As previously mentioned, the catalyst solution comprises a Group VIII noble metal and a halogen, i.e., bromine- or chlorine-containing compound. The Group VIII noble metal, platinum, rhodium, ruthenium, osmium, iridium and palladium, are all active for my reaction; however, I prefer palladium because of its much greater activity. In general, the noble metal can be employed in amounts between about 0.001 and 5.0 weight percent of the liquid reaction medium. In general, however, the reaction rate decreases at concentrations of noble metal less than about 0.04 weight percent and amounts of noble metal in excess of about 0.25 weight percent do not affect the rate of oxidation. Accordingly, the preferred limit of noble metal is between about 0.04 and about 0.25 weight percent of the catalyst solution. The noble metal can be added to the reaction medium as finely divided metal, as a soluble salt or as a chelate. Examples of suitable salts are the halides and acetates such as palladium chloride, rhodium acetate, ruthenium bromide, osmium oxide, iridium chloride and palladium chloride. Examples of suitable chelates are palladium acetylacetonate and complexes of noble metal ions with such conventional chelating agents as ethylene diamine tetraacetic acid, citric acid, etc.

The other necessary component of my catalyst solution is a halogen, i.e., bromine- or chlorine-containing compound. The halogen can be added as elemental chlorine or bromine; however, it is preferred to employ less volatile halogen compounds such as hydrogen chloride, hydrogen bromide; alkali metal halides, e.g., sodium chloride, lithium bromide, cesium chloride, potassium bromide, sodium bromate, lithium chlorate; ammonium halides, ammonium bromide, ammonium chloride; or any of the aforementioned Group VIII noble metal bromides or chlorides. Various organic compounds which liberate hydrogen halide or halogen under the reaction conditions can be used such as aliphatic chlorides or bromides, e.g., ethyl bromide, propyl chloride, butyl chloride, benzyl bromide, phosgene, etc. In general, sufficient of the aforementioned halogen-containing compounds should be added to provide between about 0.05 and about 5.0 weight percent free or combined halogen in the reaction zone; preferably concentrations between about 0.1 and about 3.0 are employed. The choice between the use of a bromine or a chlorine-containing compound can be made with due regard to the desired reaction. In general, I have found that the chloride compounds tend to favor the oxidation to acetaldehyde and, ultimately, to acetic acid, whereas the bromine compounds tend to favor the oxidation of ethylene to vinyl acetate.

As disclosed in my parent application, the composition of the reaction medium exerts a considerable effect on the yield of various products, vinyl acetate, acetaldehyde, and acetic acid, as well as on the rate of oxidation. In general, the yield of vinyl acetate is maximized by use of an anhydrous or substantially anhydrous reaction medium and by the presence of acetate ions; increased acetaldehyde production occurs with increased water content in the reaction medium and acetic acid production increases concurrently therewith.

In general, for the production of vinyl acetate, the water content of the reaction medium should be less than about 20 weight percent; preferably should be between about 0 and about 10 weight percent and most preferably, between about 0 and about 3 weight percent. I have further discovered that the amount of water in the reaction medium substantially affects the reaction rate in general, the production of vinyl acetate in an anhydrous reaction medium is exceedingly rapid and the addition of amounts of water in excess of about 2 to 3 weight percent substantially decreases the rate of oxidation.

As previously mentioned, the reaction medium should comprise acetic acid; however, the presence of other organic solvents that are inert under the oxidation conditions is not precluded. Examples of various organic liquids that can also be present in amounts from about 0 to about 90 percent of the reaction medium include formamide, dimethyl formamide, chlorobenzene, dichlorobenzene, aliphatic hydrocarbons such as hexane, decane, dodecane, etc.; toluene; however aliphatic acids having two to about five carbons, i.e., acetic, propionic, butyric, valeric, isovaleric, caproic, isocaproic, succinic, gluteric, adipic, pimellic, etc., can be used. Of these, acetic is preferred as the entire reaction medium.

The proportion of vinyl acetate in the oxidized product can be greatly increased by the addition of acetate salts to the reaction medium. Generally any soluble acetate salts can be added such as alkali metal acetates, alkali earth acetates, any of the aforementioned Group VIII noble metal acetates or an acetate of the optional redox metals hereafter described. The alkali metal acetates are preferred for their greater solubility in the medium and of these lithium acetate is most preferred. Generally between about 0.1 and about 10 weight percent of a soluble acetate salt is used; preferably between about 0.5 and about 5.0 weight percent is employed. The particular alkali metal chosen has some effect on the distribution of products; the use of sodium and potassium acetate generally favor acetaldehyde and vinyl acetate production and the lithium salts favor acetic acid production. Lithium salts, however, are preferred because of their greater solubility and hence, the higher acetate ion concentration that can be achieved with the use of lithium.

It is of course apparent that the acetate salts can be formed in situ by the addition of hydroxides of most of the aforementioned metals, particularly the alkali metal hydroxides or halides.

As previously mentioned, various redox compounds can, optionally, be used. Typical of such are the soluble salts of multivalent metal ions such as the acetates, bromides, or chlorides of copper, iron, thallium, manganese, cobalt, silver, mercury, nickel, cerium, titanium, uranium, bismuth, tantalum, tin, lead, chromium, molybdenum, vanadium or antimony. Of these, cupric and ferric salts are preferred and cupric salts are most preferred, particularly in a substantially anhydrous medium where the cupric salts appreciably increase the rate of oxidation. In general, cupric acetate, chloride or bromide is added to the reaction medium to provide a concentration of copper therein from about 0.1 to about 5 weight percent; preferably from about 0.5 to about 2.0 weight percent is employed.

As disclosed in my copending application, Serial No. 161,932, various oxidizing agents can also be employed to accelerate the rate of reaction. Included in such oxidizing agents are the nitrogen oxides which function in a manner similar to the redox agents previously described. These nitrogen oxides can be employed as the only redox agent in the reaction medium or they can be employed jointly with the aforedescribed redox metal salts such as cupric or ferric salts. In general, between about 0.01 and about 3 weight percent of the reaction medium; preferably between about 0.1 and about 1 weight percent; calculated as nitrogen dioxide, can comprise a nitrogen oxide that is added as a nitrate or nitrite salt or as nitrogen oxides. The nitrogen oxides can be added to the reaction medium in various forms, e.g., nitrogen oxide vapors such as nitric oxide, nitrogen dioxide, nitrogen tetraoxide, etc., can be introduced into the reaction medium or soluble nitrate or nitrite salts such as sodium nitrate, lithium nitrate, lithium nitrite, potassium nitrate, cesium nitrate, etc., can be added to the reaction medium. In general, the use of these nitrate redox agents are preferred in anhydrous systems and the combined use of cupric salts and nitrate co-redox agents is most preferred for the low temperature operations where the reaction rate would otherwise be prohibitively slow. The use of nitrogen oxides as redox agents does not appreciably alter the yields of the major products, i.e., vinyl acetate, acetaldehyde and acetic acid.

In general the oxidation is performed by introducing oxygen or an oxygen-containing gas and ethylene into contact with the catalyst at temperatures between about 30° and about 300° C.; 90° to about 180° C. are preferred and, to obtain optimum yields of vinyl acetate, temperatures between about 120° and about 160° C. are most preferred. In general, the yield of acetic acid is favored at higher temperatures and when operating so as to generate sufficient acetic acid in situ to equal that consumed in the formation of vinyl acetate, the higher temperatures are preferred, from about 130° to about 180° C.

The reaction pressures employed are sufficient to maintain liquid phase conditions and from about atmospheric to about 100 atmospheres or more; preferably elevated pressures from about 10 to about 75 atmospheres are employed and most preferably, pressures from about 40 to about 75 atmospheres are employed to obtain a high reaction rate. In general, high pressures and high ethylene partial pressures result in increased or maximum acetaldehyde and vinyl acetate yields and minimum yields of acetic acid. Additionally, the higher ethylene partial pressures favor high reaction rates.

Under the aforedescribed conditions, the ethylene is rapidly oxidized to the desired carbonyl compounds. In general, the liquid catalyst solution is supplied and recycled to the reaction zone at maximum rates to prevent the accumulation of substantial amounts of water which will reduce the rate of oxidation.

As previously mentioned, an important discovery of my instantly claimed invention comprises the recycling of the high boiling oxidation by-products and vinyl acetate polymer formed in the oxidation zone. Contrary to expectations, I have discovered that the recycling of the polyvinyl acetate by-product and recycling of the ethylidene diacetate and ethylene glycol diacetate fractions prevents a continuous accumulation of these products from the oxidation so that a steady state concentration of these materials is achieved. Under these conditions, the formation of these products and the loss of ethylene thereto can be substantially reduced in the process.

While the invention has been described with particular reference to the oxidation of acetaldehyde to acetic acid in the vinyl acetate reactor, it is apparent from the preceding discussion that conditions which favor the production of vinyl acetate do not necessarily favor the oxidation to acetic acid. Accordingly, it is within the scope of my presently claimed invention to employ a separate oxidation step for the conversion of the acetaldehyde oxidation product from the primary reactor to acetic acid which can be recycled to the reactor to replenish that consumed in the formation of vinyl acetate. In this manner, a complete synthesis of vinyl acetate from ethylene and oxygen is nevertheless provided, the only distinction being the separate oxidation of the acetaldehyde by-product to acetic acid.

My invention will now be described with particular reference to the figure which illustrates the process of my invention.

Referring now to the figure, the process therein depicted comprises the introduction of ethylene through line 1 to the reactor 2 together with a supply of the necessary amount of oxygen through line 3. Reactor 2 can employ various liquid gas contacting means including a stirred vessel or a reactor packed with an inert support such as fused silica, Carborundum, titania, carbon, diatomaceous earth, etc. The space velocity of the reactants through reactor 2 is adjusted to achieve the optimum conversion desired and the effluent is passed through line 4 to a high pressure ethylene separator 5. The ethylene separated from the liquid in vessel 5 is passed through cooler 6 to compressor 7 for recycling through line 8 to the oxidation vessel. The liquid slurry from vessel 5 is withdrawn through line 9 and passed through cooler 10 where its temperature is reduced to about 90° F. The cooled liquid is then passed to a low pressure gas separator 11 where the residual ethylene is removed from the catalyst solution and passed for recycling through line 12 to pump 13.

The liquid slurry is withdrawn from vessel 11 through line 14 and pump 15 to the crude product flash tower 16. Residual ethylene is withdrawn from the flash tower through line 17 and returned to the oxidation zone by pump 13. Liquid bottoms from vessel 16 are withdrawn through line 18 to reboiler 19 to supply the necessary heat for the vaporization of the crude product contained therein.

The high boiling catalyst solution comprising chiefly acetic acid is withdrawn through line 20 to pump 21 and returned for recycling to the oxidation zone through lines 22 and 23.

I have found that the recycling of this high boiling fraction to the oxidation zone substantially reduces the formation of ethylidene diacetate, ethylene glycol diacetate and polyvinyl acetate in the oxidation reactor 2. However, since the recycling does not completely inhibit the formation of these high-boiling products, it may be desirable under some circumstances to withdraw a bleed portion comprising from about 1 to about 50, generally about 1 to about 5, weight percent of this recycle through line 24 to a separate oxidation unit 25 where the high-boiling components are oxidized to acetic acid. Various well known oxidation conditions can be employed in zone 25 to convert these by-products to acetic acid.

The oxidation of the aforementioned by-products can be catalytic or non-catalytic in which the by-products are contacted, preferably in liquid phase, with an oxygen-containing gas introduced through line 26 at temperatures between about 150° and about 275° C. and sufficient pressure to maintain said liquid phase conditions. The oxidation can be conducted in the presence of a suitable oxidation catalyst such as a heavy metal having an atomic number of 23 to 28 inclusive. Examples of such metals are manganese, cobalt, nickel, chromium, vanadium, molybdenum, tungsten, tin, cerium and mixtures thereof. Preferably, however, no extraneous catalytic metal is introduced to this oxidation, but rather the oxidation employs the catalytic palladium and optional redox agent of the catalyst solution. In general, however, when an additional catalytic metal is employed, it is added in amounts between about 0.01 and about 5 weight percent as a soluble salt such as the acetate, chloride, bromide, etc., as finely divided metal or as a chelate. It is also desirable to have between about 0.01 and about 2.0 weight percent of a halide, e.g., bromine or chlorine containing substance in this oxidation zone to promote the oxidation; generally no halogen need be added since sufficient halogen is in the liquid residue from tower 16; however, if necessary, any of the aforementioned bromine compounds can be added to this oxidation zone. The oxidized product from zone 25 is withdrawn through line 27 and can be directly recycled to the reactor when no extraneous metals are added as catalysts in the oxidation step within vessel 25. When the amount of oxidized recycle represents a substantial quantity of the recycled liquid in line 22, it is desirable to return the oxidized product from line 27 to vessel 16 for removal of its water content. This can be accomplished by passing the product through line 27a to a discharge side of pump 15 as shown.

When additional metals are added, however, it is preferred to separate the acetic acid from these metals, preferably by a separate distillation (not shown) to recover an acetic acid for recycling to the oxidation reactor 2. When such separation of acetic acid is performed, it is also preferred to purify the liquid residue from this distillation for the recovery of palladium therefrom for recycling to the reactor. The remainder of such liquid bottoms from the distillation can, of course, be recycled to oxidation zone 25 since such liquid bottoms contain the necessary catalyst metal, e.g., cobalt, manganese, etc., employed in this oxidation.

The oxidized products from flash tower 16 are removed through line 28 to vessel 29 where the acetaldehyde is removed as overhead through line 30, condensed in cooler 31 and collected in distillate drum 32. The acetaldehyde product is withdrawn from distillate drum through line 33 to pump 34 for reflux to tower 29 through line 35; as recycle to oxidation zone 2 through line 36 and 38; and when it is desired to recover acetaldehyde as a product from the system, this product is withdrawn through line 37. This product also contains 1 to about 10 of ethylene oxide that can be recovered therefrom by subsequent distillation. When desired, the entire crude acetaldehyde stream of line 36 can also be fractionated to separate therefrom its ethylene oxide content as a valuable product prior to recycling through line 38. A simple fractionation readily accomplishes this separation because of the dissimilarity in their boiling points.

The liquid bottoms from the crude acetaldehyde distillation tower 29 are withdrawn through line 39 and passed to fractionater 40. Methyl acetate is withdrawn as overhead from distillation tower 40 through line 41, cooled in condenser 42 and collected in distillate drum 43.

The distillate is withdrawn through line 44 to pump 45 and returned as reflux to tower 40 to line 46. The production of methyl acetate is withdrawn from the distillation train through line 47 and, preferably, this material is recycled to the oxidation zone through line 48 to inhibit this formation therein. When desired, a net production of methyl acetate can also be withdrawn from the system through line 49.

The liquid residue containing acetic acid, water, methyl acetate and vinyl acetate is withdrawn from tower 40 through line 50 and passed to distillation zone 51. An aqueous azeotrope of vinyl acetate with an atmospheric boiling point about 65° to 72° C. is withdrawn from vessel 51 as overhead through line 52 and passed to cooler 53 and distillate drum 54. The azeotrope condensate separates into an aqueous phase and an organic phase within distillate drum 54. The aqueous phase is withdrawn through line 55 and pump 56 and passed through line 57 to stripping tower 58. Steam is supplied to stripping tower 58 through line 59 to vaporize the residual vinyl acetate contained in the liquid feed thereto and this vinyl acetate is removed overhead from the stripping tower through line 60 for return to vapor line 52. The water is withdrawn from the system through line 61 and passed to suitable disposal means.

The liquid bottoms from vessel 51 comprises essentially acetic acid. This material is withdrawn through line 62 and pump 63 for recycling to the process through line 64.

The crude vinyl acetate within condensate drum 54 is withdrawn through line 65 and pump 66 and passed through line 67 to a drying column 68 wherein the residual water is removed as a vinyl acetate azeotropic vapor through line 69 and returned to cooler 53 for recovery of the vinyl acetate. Heat is supplied to this column through a steam coil 70 within the drying column. The vinyl acetate liquid within vessel 68 contains some ethyl acetate by-product from the oxidation and this liquid is withdrawn as bottoms through line 71 and passed to distillation tower 72 wherein pure vinyl acetate is recovered as overhead, condensed in cooler 74 and collected in product receiver 75. The vinyl acetate is withdrawn from the receiver through line 76 and pump 77, a portion thereof being returned as reflux to tower 72 through line 78 and the net production of vinyl acetate being withdrawn as product from the process through line 79.

The ethyl acetate by-product from the process collects at liquid bottoms within distillation tower 72 and is withdrawn therefrom through line 93 and pump 94 for recycle to the oxidation step through line 95 or for withdrawal from the system through line 96. As with the other by-products of the system, the recycling of the ethyl acetate to oxidation reactor 2 reduces its net accumulation or production from the process and thereby increases the efficiency of the oxidation to the production of more valuable products, primarily vinyl acetate and/or acetaldehyde.

The incondensible gases collected at various points through the distillation train, for example, in distillate receivers 32, 43, 54 and 75 are passed to the main gas and blowdown line 80 through lines 81, 82, 83 and 84, respectively.

The ethylene recycle from compressors 7 and 13 is generally passed directly back to oxidation zone 2. In general, however, a slight conversion to carbon oxides is experienced during the oxidation and a portion or all of this recycle ethylene stream can be treated to remove the carbon oxides therefrom. Generally this can be accomplished by passing all or a portion of the recycle ethylene through a scrubbing tower for the recovery of carbon dioxide therefrom. This unit is diagrammatically depicted as block 85 in the flow diagram, the carbon dioxide being removed through line 88. During the oxidation, a slight conversion to butenes is also experienced and, conveniently, these can be removed from the ethylene stream prior to recycling by a fractionation that can also be included in block 85. The butenes can be removed through line 89 as a product or can be further oxidized to acetic acid for recycle to reactor 2, if desired.

During operations in which the oxidation of ethylene to acetic acid is not sufficient to replenish the acetic consumed in the synthesis of vinyl acetate, slight addition of acetic acid may be necessary and this can readily be performed through line 86. Additionally, a slight loss of halogen may be experienced during the operation and therefore any of the aforementioned halogen containing compounds can be added in sufficient amount to maintain the desired concentration of halogen in the system through line 87. Additionally, any loss of the redox agents, when employed, can also be replenished through line 87, e.g., acetic acid solutions of the various metal salts such as ferric or cupric acetate or halide can be added through line 87. When nitrogen oxides are employed, particularly during the low temperature operations disclosed herein, any loss of nitrogen that may occur can be replenished by the addition of nitrogen oxides, nitrate or nitrite salts, through line 87. Preferably, an acetic acid solution of sodium or lithium nitrate is employed as makeup for the nitrogen oxides.

To maintain minimum capital investment for the process, it is preferred to obtain the necessary acetic acid for the synthesis by concurrent oxidation of acetaldehyde in reactor 2. As previously described, this is achieved by recycling acetaldehyde through line 38 to recycle line 23 and by adjusting the process variables to favor acetic production in reactor 2 such as increasing the concentration of halide ion, particularly chloride, to the upper limit of the aforecited range of concentration, e.g., about 1.5 to 5 percent, and by operating at higher reactor temperatures, e.g., 150° to 180° C.

It is of course apparent that optimum conditions for acetaldehyde oxidation to acetic acid can be achieved by oxidizing the acetaldehyde to acetic acid in a separate reactor. Such a supplement to the process is shown as reactor 90 to which all or a portion of the recycle from line 23 can be passed through line 91. Oxygen is supplied to this reactor through line 92 to oxidize the recycled acetaldehyde to acetic acid. In this reactor, the partial pressure of oxygen, residence time and temperature can be independently controlled to favor oxidation of acetaldehyde in the recycle stream to acetic acid. Because of the absence of ethylene in vessel 90, higher partial pressures of oxygen can be used without achieving an explosive gas mixture. Additionally, complete oxidation of the recycled acetaldehyde to acetic acid is possible. In general, temperatures from about 100° to about 200° C.; preferably from about 120° to about 160° C. are employed in vessel 90.

The following examples will illustrate the results obtainable when practicing my invention:

*Example 1*

A two-liter capacity autoclave of a titanium alloy fitted with an electric heater, a stirrer and an internal cooling coil was used in the experiments. The autoclave was charged with 500 grams of acetic acid that contained 1.0 grams palladium chloride, 4.0 grams lithium chloride, 4.0 grams lithium acetate dihydrate and 3.0 grams of cupric acetate monohydrate, closed and pressured to 500 p.s.i.g. with ethylene. The autoclave was then heated to about 150° C. and the pressure adjusted to 750 p.s.i.g. with ethylene. Thereafter oxygen was slowly admitted over a 30-minute reaction period. At the end of the period, the autoclave was cooled, emptied and the crude product was distilled to recover the following products:

| Run Number | 1 |
|---|---|
| Acetaldehyde _____grams__ | 42 |
| Vinyl acetate _____do____ | 139 |
| Diesters _____do____ | 12 |
| Polyvinyl acetate _____do____ | 3 |
| Methyl acetate _____do____ | 2.5 |
| Ethyl acetate _____do____ | 2 |

The autoclave was again charged with the acetic acid solvent containing the catalyst components, together with 50 grams of acetaldehyde and the oxidation procedure was repeated. The volatile products were fractioned from the crude contents of the autoclave and the liquid residue-acetic acid and higher boiling by-products were returned to the autoclave together with 50 grams of acetaldehyde. After four successive oxidations in this manner, the high boiling by-products were recovered from the reaction solvent. The following table summarizes the results:

| Run Number | 2 | 3 | 4 | 5 |
|---|---|---|---|---|
|  | Grams | Grams | Grams | Grams |
| Acetaldehyde, net make or (consumption) | 4 | 7.5 | 16 | 23.5 |
| Vinyl acetate | 67 | 113.5 | 47.5 | 45 |
| Diesters |  |  |  | 27 |
| Polyvinyl acetate |  |  |  | 6 |
| Methyl acetate | 2 | 6.5 | 3.5 | 6 |
| Ethyl acetate | 1 | 1 | 0.5 | 0.5 |

The preceding demonstrate that recycling the high-boiling by-products of the oxidation substantially reduced their net accumulation or production, e.g., after four runs the expected amount of diesters would be 48 grams if no recycle whereas only 27 were present after 4 recycle oxidations. The polyvinyl acetate make was also reduced from an anticipated 12 grams to 6 with recycling. The yield of vinyl acetate fluctuated considerably during the runs. This result was caused by loss of chloride from the system. When chloride is restored to the system as hydrogen chloride, high conversion rates to vinyl acetate are again experienced.

*Example 2*

The autoclave was charged with 500 grams of acetic acid containing 1.0 gram palladium chloride, 6.0 grams lithium chloride, 6.0 grams lithium acetate, 6.0 grams sodium nitrate and 50 grams acetaldehyde. The autoclave was pressured to 500 p.s.i.g. with ethylene, heated to about 120° C. and then pressured to 750 p.s.i.g. ethylene. Oxygen was slowly admitted over a 30-minute period. Thereafter the autoclave was cooled, emptied and the crude product fractionated. The experiment was repeated four times recycling the higher boiling acetic acid solvent containing the ester by-product and polyvinylacetate. The results are summarized in the following table:

| Run Number | 1 | 2 | 3 | 4 | 5 |
|---|---|---|---|---|---|
| Acetaldehyde, net make (consumption) | Grams 20.5 | Grams 8 | Grams 11 | Grams 21.5 | Grams 23.5 |
| Vinyl acetate | 93.3 | 87 | 110 | 79.5 | 78 |
| Diester | 24 | | | | 26 |
| Polyvinyl acetate | 2 | | | | 5 |
| Methyl acetate | 7 | 7.5 | 7 | 5.5 | 7 |
| Ethyl acetate | 1 | 2.5 | Trace | | |

The preceding demonstrate that with the nitrate redox system, comparable inhibition of the high-boiling by-products yield can be achieved, the diester yield reduced from an expected 96 grams to 26 grams and the polyvinylacetate yield reduced from an expected 8 grams to 5 grams.

The preceding examples are intended solely to illustrate the results obtainable by the process of my invention that is defined by the method steps or their equivalents set forth in the following claims.

I claim:
1. The process for the manufacture of vinyl acetate from ethylene that comprises contacting ethylene and oxygen at a temperature between about 30° and 300° C. and a pressure between about 1 and about 100 atmospheres with a substantially anhydrous organic reaction medium comprising acetic acid and containing:
   (1) from about 0.001 to about 5.0 weight percent palladium;
   (2) from about 0.05 to about 5.0 weight percent (as halogen) of a halogen compound soluble in said reaction medium and selected from the class consisting of chlorine and bromine containing compounds; and
   (3) from about 0.1 to about 10.0 weight percent of an alkali metal acetate;
withdrawing a crude reaction product containing desired products and by-products comprising polyvinyl acetate, ethylidene diacetate and ethylene glycol diacetate, reducing said pressure of said crude product to remove unreacted ethylene therefrom and distilling the liquid residue to recover acetaldehyde and vinyl acetate as desired products and to remove water from the reaction medium and, continuing said contacting of ethylene and oxygen while recycling said reaction medium containing said undesired by-products to contact with said ethylene and oxygen to minimize the net yield of said by-products from said process.

2. The process of claim 1 wherein said reaction medium also contains from about 0.1 to about 5 weight percent of a multivalent metal ion selected from the class of cupric and ferric ions.

3. The process of claim 1 wherein said reaction medium also contains from about 0.01 to about 3.0 weight percent (calculated as nitrogen dioxide) of a nitrogen oxide.

4. The process of claim 2 wherein said reaction medium also contains from about 0.01 to about 3.0 weight percent (calculated as nitrogen dioxide) of a nitrogen oxide.

5. The process of claim 1 wherein between about 1 and about 50 percent of said reaction medium, prior to recycling, is subjected to oxidation at temperatures between about 150° and about 275° C. and sufficient time to oxidize said ethylidene diacetate, ethylene glycol diacetate and polyvinyl acetate to acetic acid.

6. The process of claim 1 wherein a portion of said acetaldehyde is combined with said reaction medium and the resulting combined stream is subjected to oxidation with oxygen at temperatures between about 100° and about 200° C. to oxidize said acetaldehyde to acetic acid prior to recycling to contact with said ethylene and oxygen.

References Cited by the Examiner
UNITED STATES PATENTS

| | | | |
|---|---|---|---|
| 1,938,453 | 12/1933 | Hale | 260—640 |
| 2,251,983 | 8/1941 | Chitwood | 260—541 |
| 2,530,512 | 11/1950 | Drewitt | 260—541 |
| 3,057,915 | 10/1962 | Riemenschneider | 260—597 |

FOREIGN PATENTS

| | | |
|---|---|---|
| 608,610 | 3/1962 | Belgium. |
| 614,970 | 9/1962 | Belgium. |
| 137,511 | 4/1961 | U.S.S.R. |

OTHER REFERENCES

Moiseev: Doklady Akademii Nauk S.S.S.R., vol. 133, pp. 377–380 (1960).

Smidt: Chemistry & Industry, Jan. 13, 1962, pp. 54–61.

Wagner: Synthetic Organic Chemistry, pp. 419–420 (1953).

LORRAINE A. WEINBERGER, *Primary Examiner.*

LEON ZITVER, *Examiner.*

D. P. CLARKE, B. EISEN, V. GARNER, *Assistant Examiners.*